(12) United States Patent
Colbaugh et al.

(10) Patent No.: US 11,177,653 B2
(45) Date of Patent: Nov. 16, 2021

(54) BUS MOUNTED SURGE PROTECTION DEVICES

(71) Applicant: Eaton Intelligent Power Limited, Dublin (IE)

(72) Inventors: Paul Anthony Colbaugh, Allison Park, PA (US); Thomas Perry Colcombe, Pittsburgh, PA (US); Daniel Lee Ellis, Pittsburgh, PA (US); Richard Alan Orman, Evansville, IN (US); Daniel Joseph Resnik, Burgettstown, PA (US); Scott Anthony Seale, Orange Beach, AL (US); James Nicholas Skoczlas, Bridgeville, PA (US); David John States, Moon Township, PA (US); Thomas Mark Young, Harmony, PA (US)

(73) Assignee: Eaton Intelligent Power Limited, Dublin (IE)

( * ) Notice: Subject to any disclaimer, the term of this patent is extended or adjusted under 35 U.S.C. 154(b) by 270 days.

(21) Appl. No.: 16/114,580

(22) Filed: Aug. 28, 2018

(65) Prior Publication Data

US 2019/0081474 A1 Mar. 14, 2019

Related U.S. Application Data

(60) Provisional application No. 62/558,646, filed on Sep. 14, 2017.

(51) Int. Cl.
*H02H 9/04* (2006.01)
*H01H 71/02* (2006.01)
*H01H 71/08* (2006.01)
*H01H 71/10* (2006.01)
*H01T 4/04* (2006.01)
(Continued)

(52) U.S. Cl.
CPC ........ *H02H 9/042* (2013.01); *H01H 71/0207* (2013.01); *H01H 71/082* (2013.01); *H01H 71/10* (2013.01); *H01T 4/04* (2013.01); *H02H 9/044* (2013.01); *H01H 2089/005* (2013.01); *H02B 1/052* (2013.01)

(58) Field of Classification Search
CPC ............. H02H 9/04–045; H01H 83/10; H01H 71/0271; H01H 2071/0278; H01H 207/0285; H02G 3/08; H02G 3/081; H02B 1/00–56
See application file for complete search history.

(56) References Cited

U.S. PATENT DOCUMENTS 4,642,733 A * 2/1987 Schacht ................. H02B 1/056
361/118
5,010,438 A 4/1991 Brady
(Continued)

*Primary Examiner* — Jared Fureman
*Assistant Examiner* — Christopher J Clark
(74) *Attorney, Agent, or Firm* — Stanek Lemon Crouse & Meeks PA

(57) ABSTRACT

Bus mounted surge protection devices are provided that are configured to be positioned in a panelboard alongside one or more similarly sized circuit breaker devices. The bus mounted surge protection device is configured to be received by a same provisional bus as the one or more circuit breaker devices and the bus mounted surge protection device is configured to protect all of the one or more circuit breaker devices in the panelboard.

17 Claims, 16 Drawing Sheets

(51) Int. Cl.
    *H02B 1/052*    (2006.01)
    *H01H 89/00*    (2006.01)

(56) References Cited

U.S. PATENT DOCUMENTS

| | | | |
|---|---|---|---|
| 5,204,800 A * | 4/1993 | Wasney | ............. H02H 9/044 |
| | | | 361/111 |
| 6,380,862 B1 | 4/2002 | Karim et al. | |
| D864,126 S | 10/2019 | Colbaugh | |
| 2018/0145486 A1 | 5/2018 | Kroushl | |
| 2018/0166241 A1 | 6/2018 | Gottschalk et al. | |
| 2019/0140429 A1 | 5/2019 | Mascarenhas | |
| 2019/0164711 A1 | 5/2019 | Caffro et al. | |
| 2019/0164713 A1 | 5/2019 | Devine | |
| 2019/0198276 A1 | 6/2019 | Abdala | |

\* cited by examiner

| FEATURE | FD-BREAKER | BUS MOUNTED SURGE PROTECTION DEVICE |
|---|---|---|
| WIDTH | 4.125 | 4.125 |
| LENGTH | 6.000 | 6.000 |
| HEIGHT TO LEDGE | 3.385 | 3.386 |
| HEIGHT TO ESCUTCHEON | 3.501 | 3.690 |
| POLE TO POLE SPACING | 1.375 | 1.375 |
| MOUNT SCREW LENGTH | 4.500 | 4.500 |
| MOUNT SCREW WIDTH | 1.375 | 1.375 |
| HEIGHT TO FRONT MOUNT | 2.891 | 2.892 |
| TERMINAL OPENING | 0.740 | 0.750 |
| BUS THICKNESS | 0.078 | 0.078 |
| STANDOFF TO BUS | 0.750 | 0.750 |
| ESCUTCHEON LENGTH | 2.719 | 2.719 |
| ESCUTCHEON WIDTH | 1.000 | 1.000 |
| TERMINAL WIDTH | 0.500 | 0.500 |
| BUS BAR HOLE DIAMETER | 0.450 | 0.450 |
| MOUNT HOLE DIAMETER | 0.197 | 0.197 |
| HEIGHT TO RESET SWITCH | - | 3.807 |
| RESET SWITCH HEIGHT | - | 0.117 |
| HEIGHT TO SURGE GND CONNECTION OPENING | - | 1.045 |
| WIDTH OF SURGE GND CONNECTION OPENING | - | 0.531 |

FIG. 12

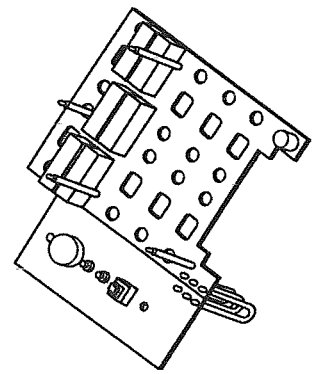
FIG. 14D
STATUS AND LED W/SNAP-OFF FEATURE
WAVE SOLDER PCB
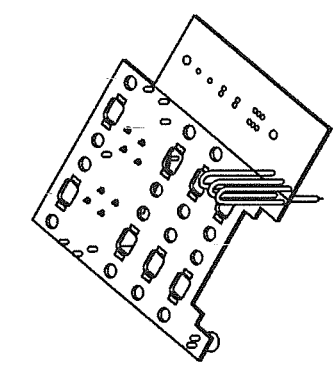
FIG. 14C
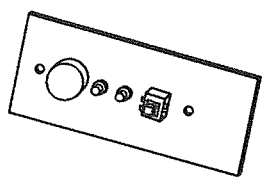
LED & ALARM PCB
FIG. 14F
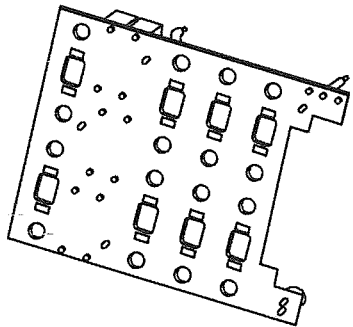
STATUS PCB
FIG. 14E
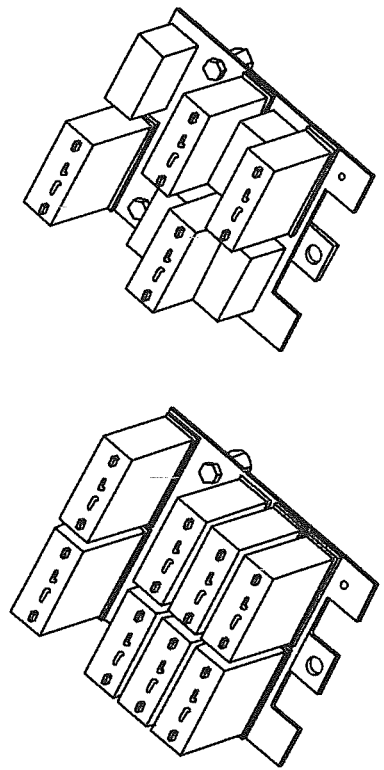
MOV PCB
FIG. 14B
FIG. 14A

BUS MOUNTED SURGE PROTECTION DEVICES

CLAIM OF PRIORITY

The present application is related to and claims priority to U.S. Provisional Application No. 62/558,646, filed Sep. 14, 2017, the disclosure of which is hereby incorporated herein by reference as if set forth in its entirety.

FIELD

The inventive concept relates generally to power devices and, more particularly, to surge protectors and related devices.

BACKGROUND

Generally electrical devices include some sort of surge protection so that if a surge is experienced the resulting damage to connected devices may be reduced, or possibly avoided. Generally, circuit breakers are provided on a panel in a housing and a surge protection device is mounted to the external surface of the housing in the field to provide protection to the connected devices.

SUMMARY

Some embodiments of the present inventive concept provide a bus mounted surge protection device configured to be positioned in a panelboard alongside one or more similarly sized circuit breaker devices. The bus mounted surge protection device is configured to be received by a same provisional bus as the one or more similarly sized circuit breaker devices and the bus mounted surge protection device is configured to protect all devices connected to the one or more similarly sized circuit breaker devices in the panelboard.

In further embodiments, the bus mounted surge protection device may be a three phase bus mounted surge protection device.

In still further embodiments, the bus mounted surge protection device may be positioned in a molded case similar in size and shape to corresponding ones of the one or more circuit breaker devices in the panelboard.

In some embodiments, a color of the molded case of the bus mounted surge protection device may be a first color and a color of a molded case of the corresponding ones of the one or more circuit breaker devices may be a second color, different from the first color.

In further embodiments, the bus mounted surge protection device may include a light emitting diode (LED) panel on a front face of the molded case.

In still further embodiments, the bus mounted surge protection device may further include a standard line side terminal and a surge ground terminal on a load side of the molded case and wherein the bus mounted surge protection device does not contain any load terminals. The surge ground terminal may be connected to one of neutral and ground with a single wire.

In some embodiments, the surge ground terminal may be connected to one of a neutral bus and a ground bus.

In further embodiments, the bus mounted surge protection device may be direct bus mounted on a line side.

In still further embodiments, the surge ground terminal may be provided in place of load side terminals on corresponding ones of the one or more circuit breaker devices.

Some embodiments of the present inventive concept provide a surge protection device including a molded housing configured to be positioned in a panelboard alongside one or more similarly sized circuit breaker devices, the surge protection device being configured to protect all devices connected to the one or more similarly sized circuit breaker devices in the panelboard; and a standard line side terminal and a surge ground terminal on a load side of the molded housing. The surge protection device does not contain any load terminals.

BRIEF DESCRIPTION OF THE DRAWINGS

FIG. 12 is a table including parameters for both a circuit breaker and a surge protection device in accordance with some embodiments of the present inventive concept.

FIGS. 14A through 14F are a series of diagrams illustrating printed circuit boards (PCBs) of the surge protection device in accordance with various embodiments of the present inventive concept.

DETAILED DESCRIPTION

Figure 1:
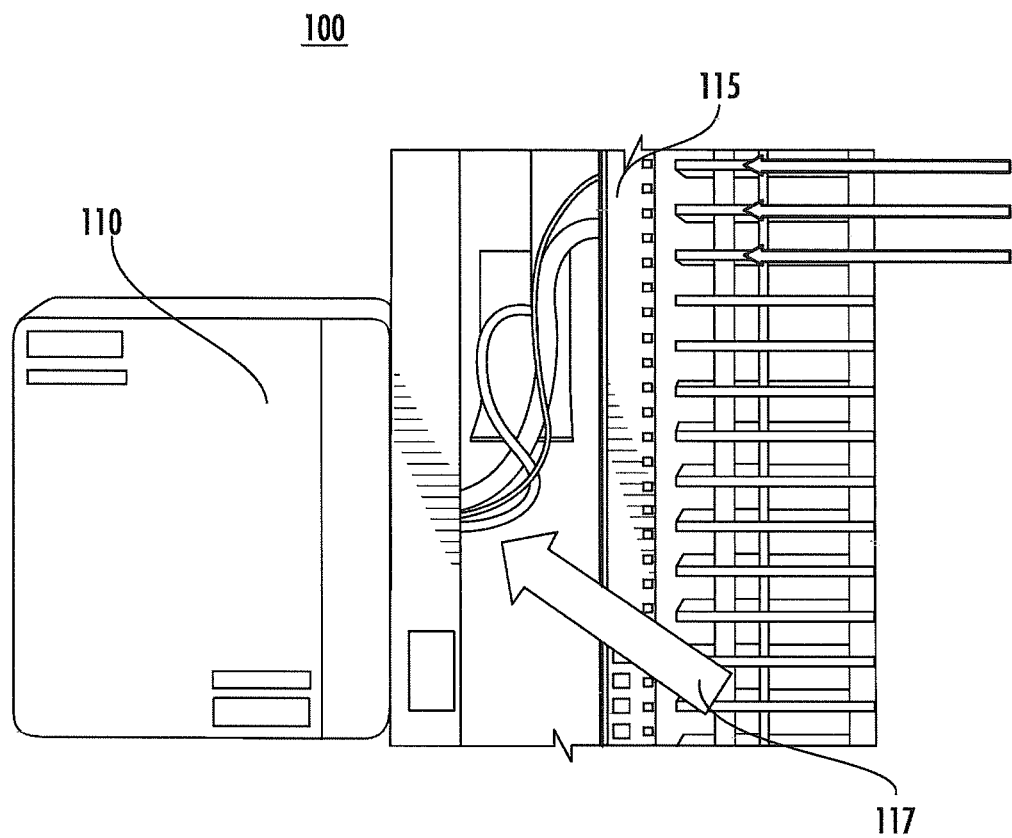
FIG. 1 is a diagram illustrating a conventional surge protection device coupled to the exterior of a panel.

Specific exemplary embodiments of the inventive concept now will be described with reference to the accompanying drawings. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive concept. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As discussed above, generally electrical devices include some sort of surge protection so that if a surge is experienced the resulting damage to any connected devices may be reduced, or possibly avoided. Generally, circuit breakers are provided on a panel in a housing and a surge protection device is mounted to the external surface of the housing in the field as illustrated, for example, in FIG. 1. In particular, FIG. 1 illustrates a conventional system 100 including a side mounted surge protection device 110 connected to the panelboard 115 with wires 117. Since the surge protection device 110 is outside the housing of the panelboard 115, it cannot be connected directly to the bus bars and, therefore, the performance of these devices may not be optimal.

Accordingly, some embodiments of the present inventive concept provide a bus mounted surge protection device configured to be positioned inside a panelboard with the circuit breakers. Thus, embodiments discussed herein provide the surge protection device in a space typically occupied by a molded case circuit breaker or within an electrical panel as will be discussed further below with respect to FIGS. 2 through 17F.

Although embodiments of the present inventive concept discussed herein are specific to three phase bus mounted surge protection devices, embodiments of the present inventive concept are not limited thereto. Concepts in accordance with embodiments discussed herein may be used with respect to other form factors without departing from the scope of the present inventive concept.

Figure 2:
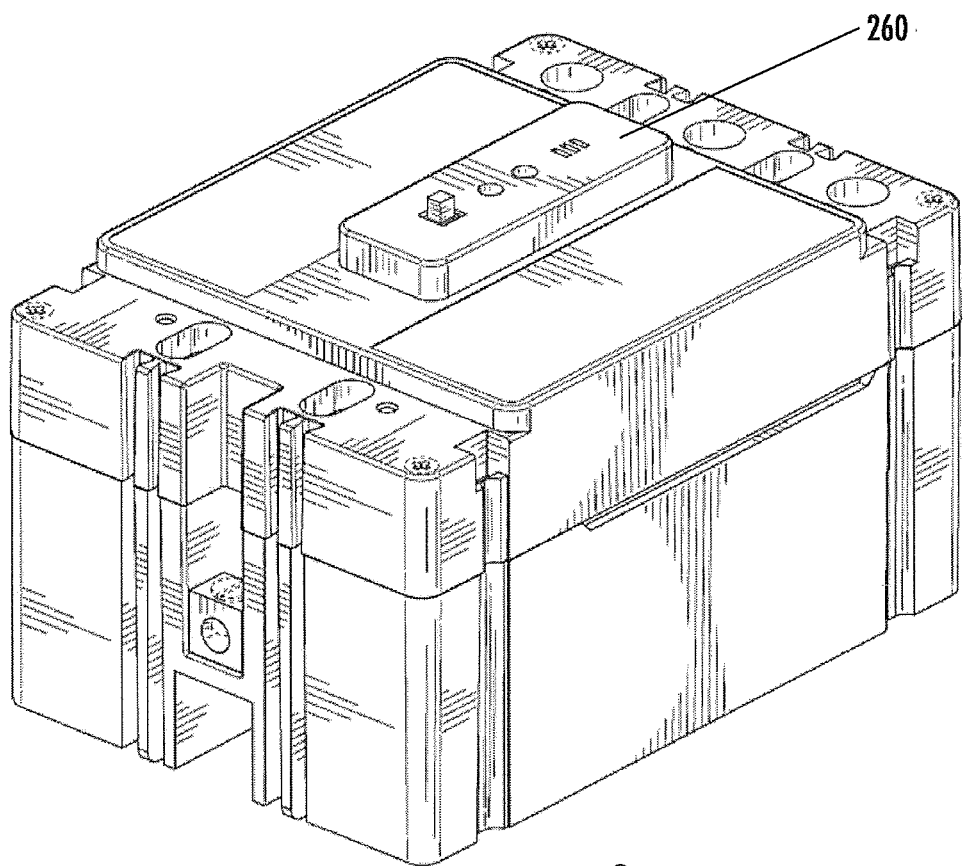
FIG. 2 is a perspective view of surge protection device in accordance with some embodiments of the present inventive concept.
Figure 3:
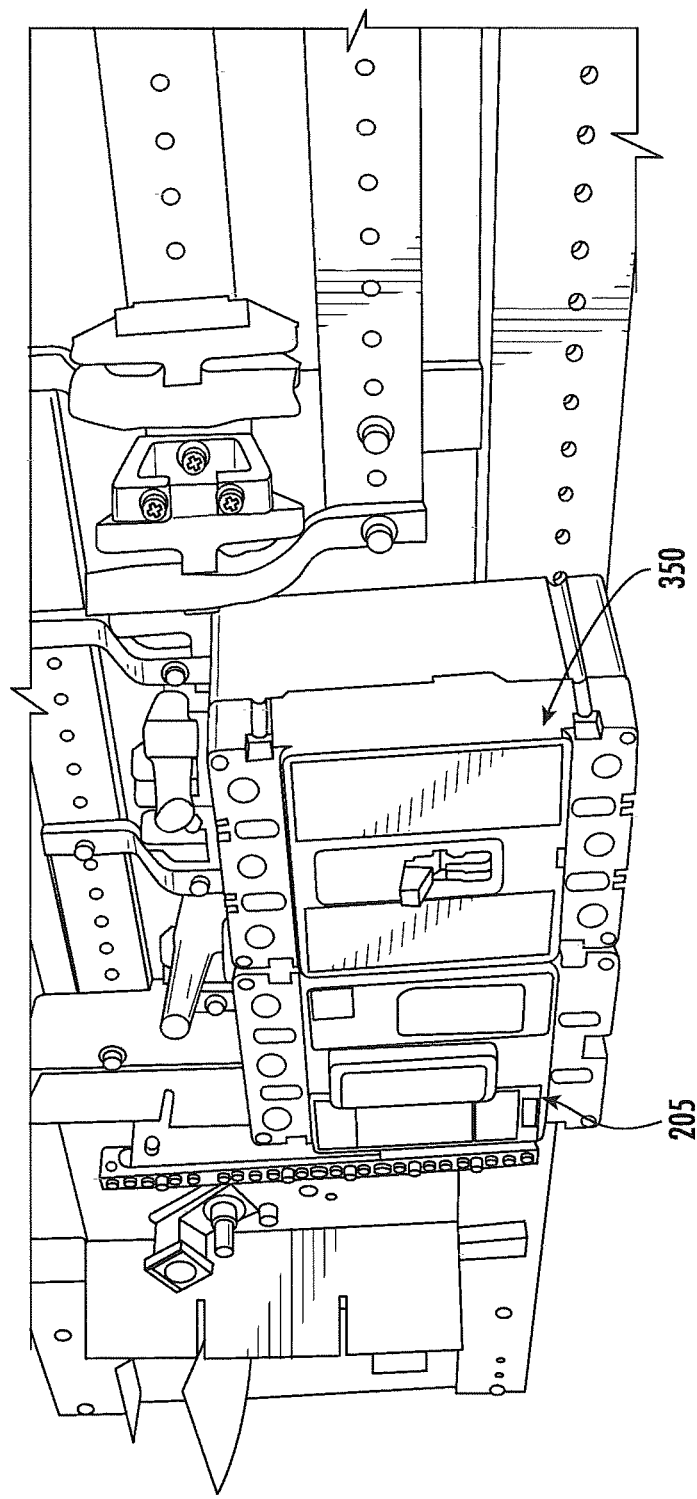
FIG. 3 illustrates a circuit breaker installed with a surge protection device in accordance with some embodiments of the present inventive concept.

Referring now to FIG. 2, a perspective view of a three phase bus mounted surge protection device in accordance with embodiments of the present inventive concept will be discussed. As illustrated in FIG. 2, the surge protection device 205 is provided in a molded case that is similar in size and shape to a circuit breaker. FIG. 3 provides an image that illustrates a surge protection device 205 positioned in a panelboard with a molded case surge circuit breaker 350. In some embodiments, the size and shape of the surge protection device 205 is similar to the size and shape of the circuit breaker 350, for example, an FD-frame breaker. In some embodiments, the covers of the two devices 205 and 350 may be different colors. For example, the surge protection device 205 may have a blue cover in some embodiments and the circuit breaker device 350 may have a white cover. It will be understood that the purpose of the different colors is differentiation between the two devices and, thus, embodiments of the present inventive concept are not limited to the white and blue colors.

Referring again to FIG. 2, the surge protection device 205 has light emitting diode (LED) indicator lights 260 where the breaker actuator/lever would reside on a circuit breaker. Furthermore, as will be discussed further below, the surge protection device 205 may have standard lineside terminals, no load terminals, and a surge ground terminal on a load side of the enclosure.

Figure 4A:
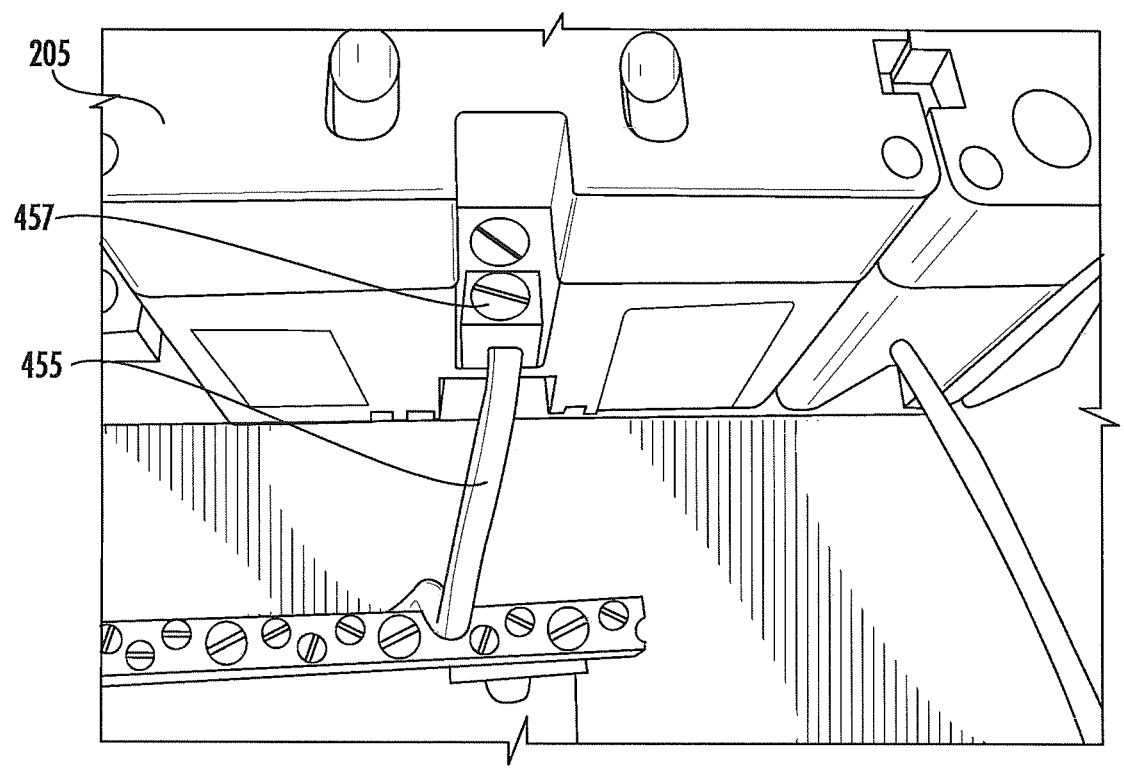
FIGS. 4A and 4B are drawings illustrating load side connections in accordance with some embodiments of the present inventive concept.
Figure 4B:
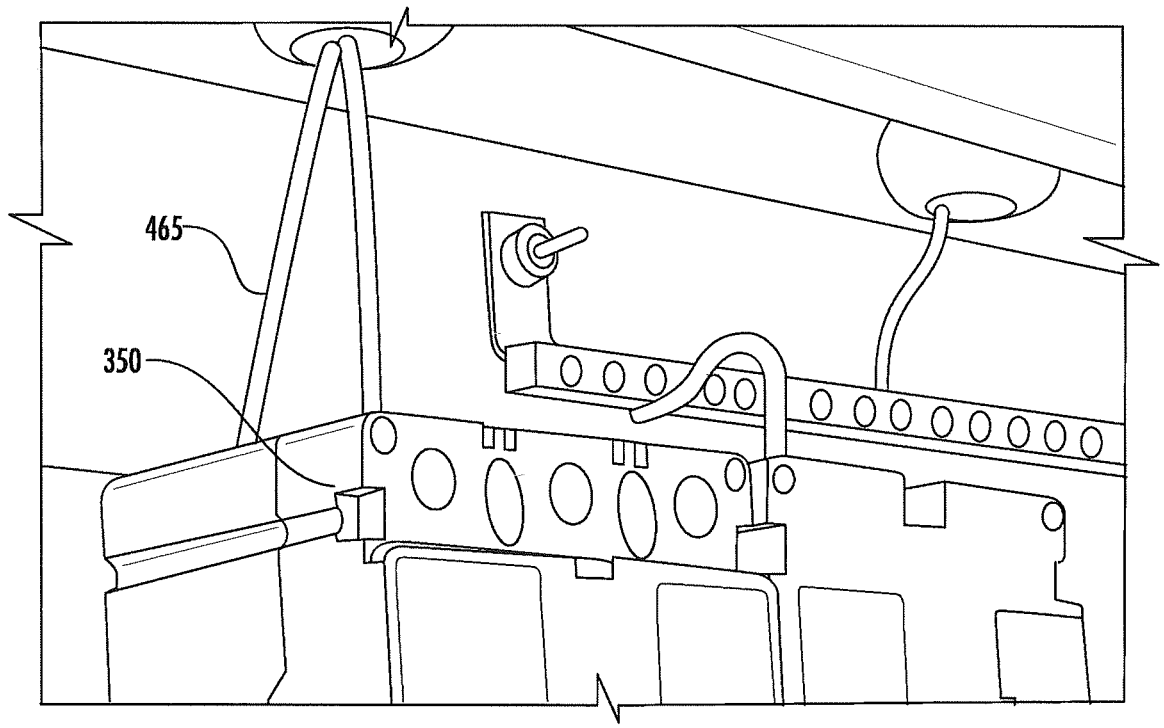

In particular, FIG. 4A illustrates the surge ground terminal 457 connected to a bus (ground or neutral) with a wire 455 in accordance with some embodiments. In some embodiments of the present inventive concept, the surge ground terminal 457 may accommodate wire sizes between 6 and 12 gauge (AWG). It will be understood that the surge ground wire length should be as short as possible. Thus, in some embodiments, the surge ground wire connects to either the neutral bus or ground bus, whichever one is closest to the surge ground terminal 457. In embodiments where the surge ground wire 455 connects the surge ground terminal 457 to the neutral bus, a white 10-gauge wire may be used. Similarly, in embodiments where the surge ground wire 455 connects the surge ground terminal 457 to the ground bus, a green 10-gauge wire may be used. It will be understood that the colors of the wires are provided for example only. The colors should be different and consistently used to allow a visual determination of which bus the surge ground terminal is connected to, however, these colors are not limited to green and white. Thus, instead of a three wire connection 465 of the circuit breaker 350 illustrated in FIG. 4B, the surge protection device 205 connects one wire 455 to the neutral or ground bus.

Figure 5A:
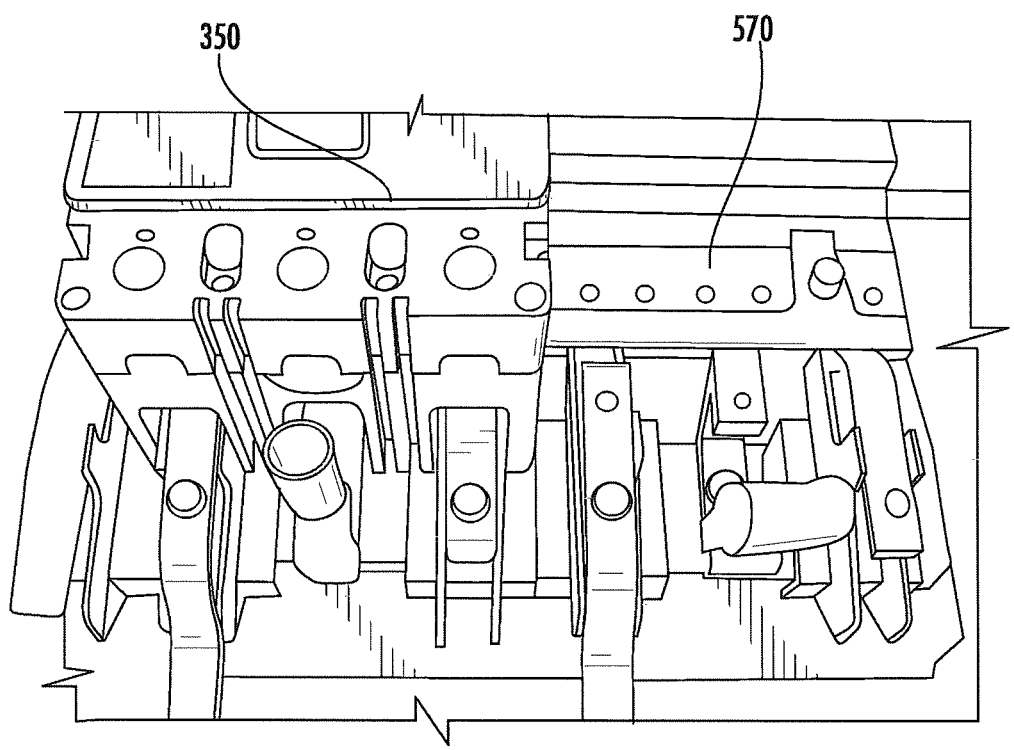
FIGS. 5A and 5B are drawings illustrating line side connections in accordance with some embodiments of the present inventive concept.
Figure 5B:
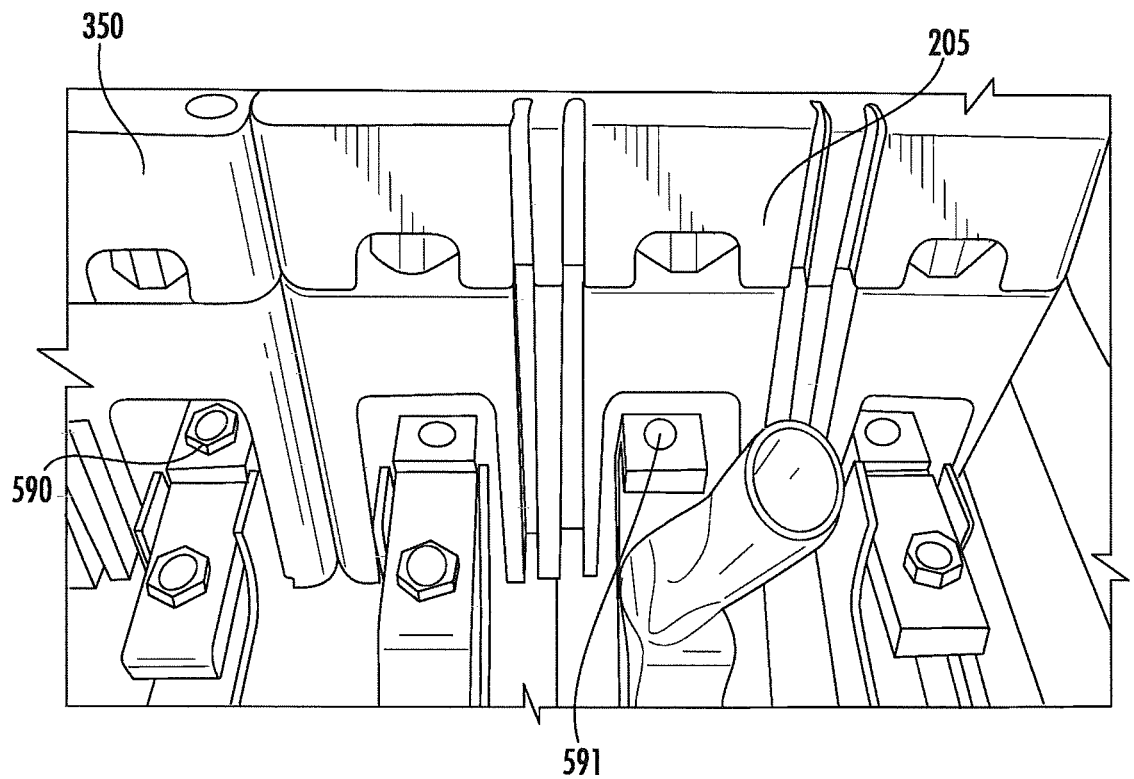
Figure 6:
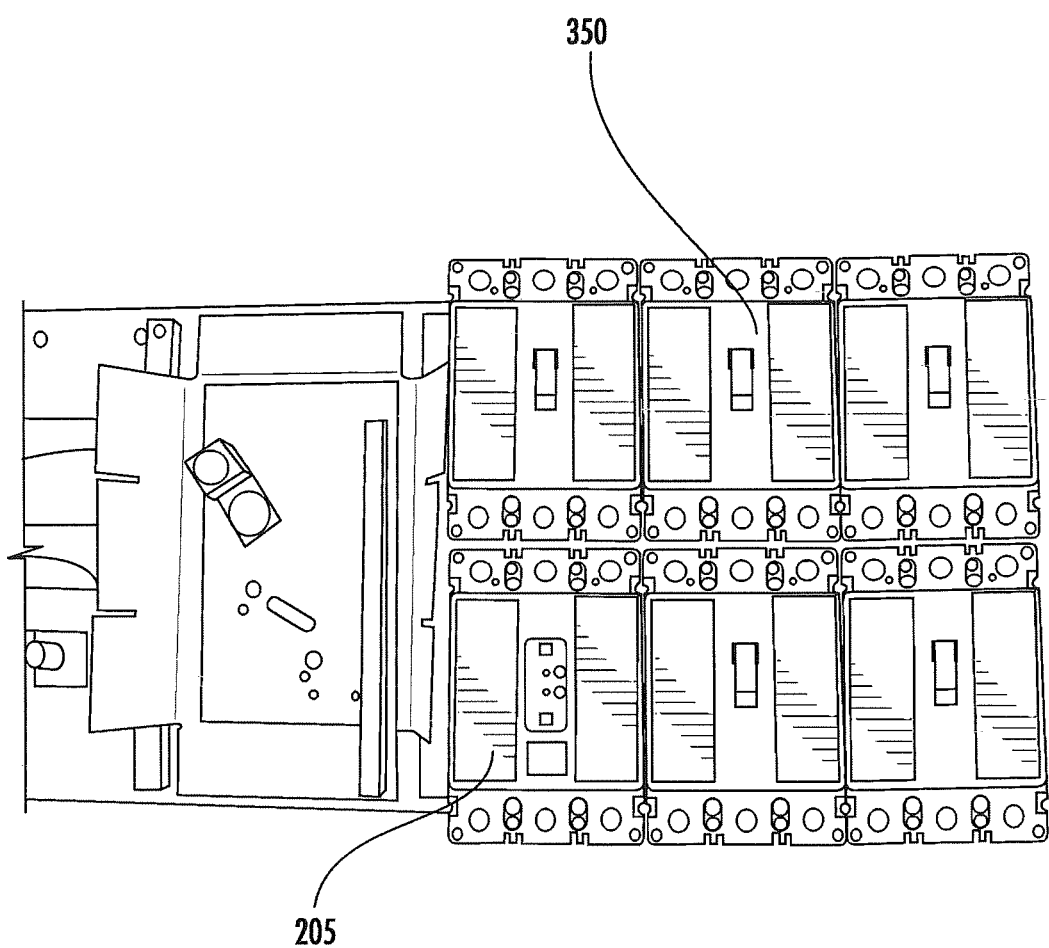
FIG. 6 is a drawing illustrating multiple circuit breakers and a surge protection device installed in a panelboard in accordance with some embodiments of the present inventive concept.

Referring now to FIGS. 5A and 5B, the line end connections for the breaker 350 and surge protection device will be discussed. As illustrated in FIG. 5A, a circuit breaker 350 is connected to the lineside panelboard. The blank provisional bus 570 is configured to receive the surge protection device 205 as illustrated in FIG. 5B. The same provisional buses may be used for both the circuit breaker 350 and the surge protection device 205 in accordance with embodiments of the present inventive concept. Although bus screws are not shown in the screw holes 591 of FIG. 5B, screws are used to secure the surge protection device 205. Screws similar to the screws 590 of the circuit breaker 350 may be used. Thus, the surge protection device is direct bus mounted on the line side, which is a three phase connection in some embodiments.

Thus, embodiments of the present inventive concept provide a three phase molded case surge protection device 205. Although the surge protection device looks like the circuit breaker 350, there is no circuit breaker inside the housing and there is no external reset switch and the surge protection device is not a load carrying device. As discussed above with respect to FIGS. 5A and 5B, the surge protection device 205 has a direct bus mount three phase connections on the line side. As further discussed with respect to FIGS. 4A and 4B, a surge ground terminal is provided in place of the load side terminals of the circuit breaker. Surge protection devices 205 in accordance with some embodiments of the present inventive concept are provided in the panel with the circuit breakers 350 as illustrated, for example, in FIG. 6. The surge protection device 205 protects the entire three phase panel, not just one circuit therein. As is further illustrated in the Figures, the front cover of the surge protection device 205 includes LED status lights. Some embodiments may have additional features such as audible alarms and alarm reset options without departing from the scope of the present inventive concept.

Some embodiments of the present inventive concept incorporate thermally protected metal oxide varistors and the surge protection device may be available with or without electromagnetic interference (EMI) filtering.

In some embodiments of the present inventive concept, the surge protective device may be installed in existing panelboards, for example, Eaton PRL3a and PRL4 panelboards, and switchboards, for example, Eaton PRLC switchboards utilizing the form and fit of the Eaton 3-pole FD frame molded case circuit breaker (MCCB). In these embodiments, the surge protection device utilizes existing 3-pole FD Frame provisions, mounting hardware and dead fronts to facilitate proper installation in the panelboard/switchboards. The surge protection device may be installed where there is a provision in an existing P&S installation or where there is available space for a 3-pole FD frame MCCB. It will be understood that these examples are provided as examples only and, therefore, embodiments of the present inventive concept are not limited thereto.

Figure 7:
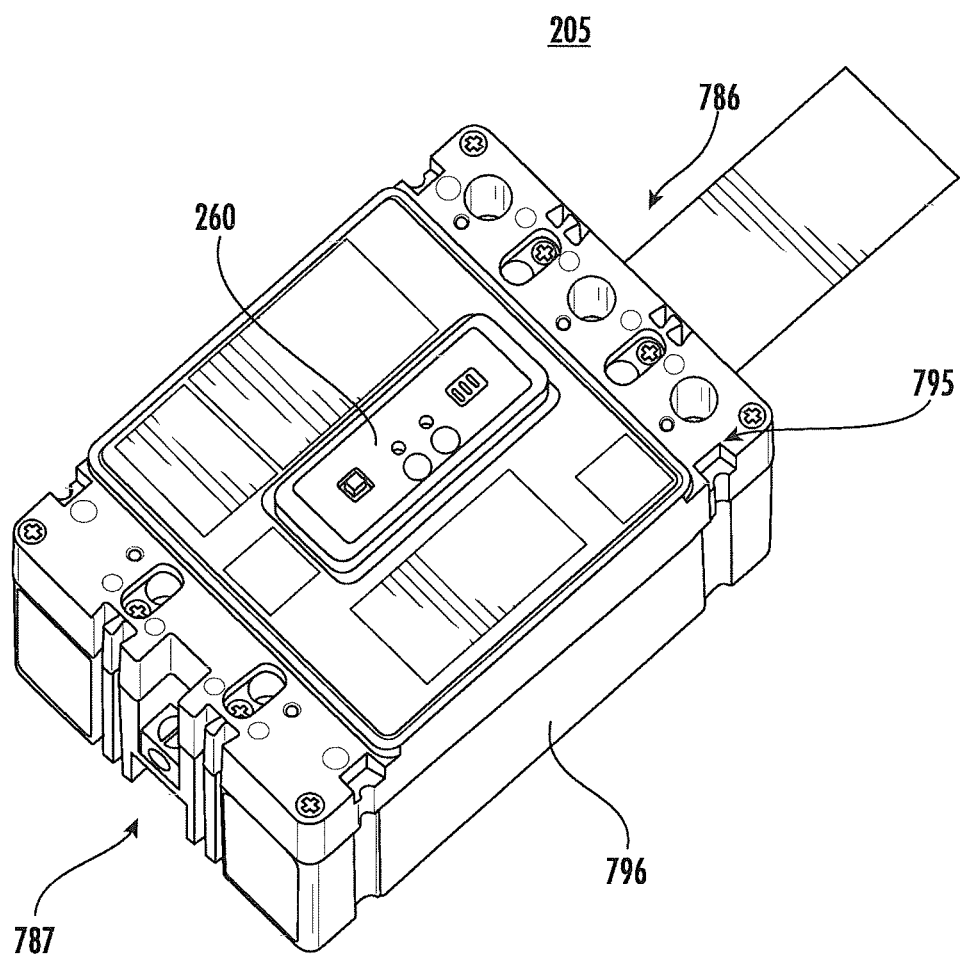
FIG. 7 is a perspective view of a surge protection device in accordance with some embodiments of the present inventive concept.

FIG. 7 is a perspective view of a surge protection device 205 in accordance with some embodiments of the present inventive concept. The LED panel 260, line end 786, cover 795 and base 796 and ground terminal end 787 of the surge protection device 205 are shown.

Figure 8:
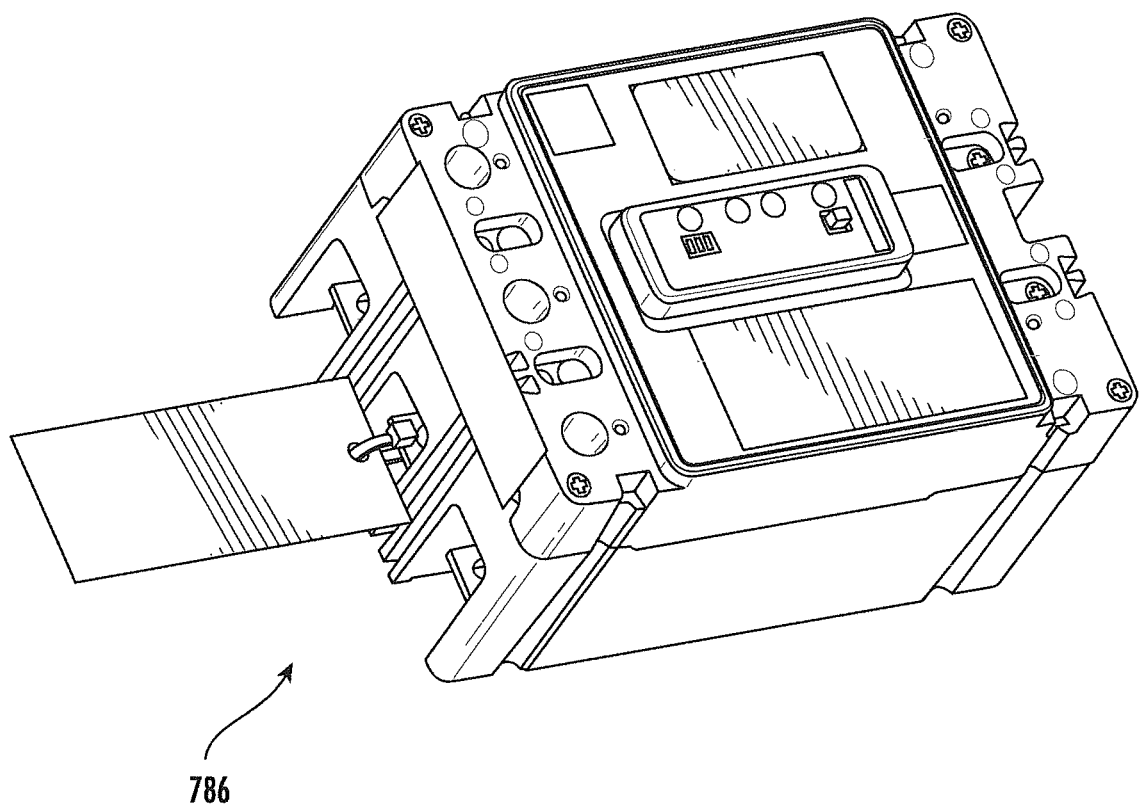
FIG. 8 is a perspective view illustrating a line end of the surge protection device in accordance with some embodiments of the present inventive concept.

FIG. 8 is a perspective view illustrating a line end of the surge protection device in accordance with some embodiments of the present inventive concept. The line end 786 of the surge protection device is shown.

Figure 9:
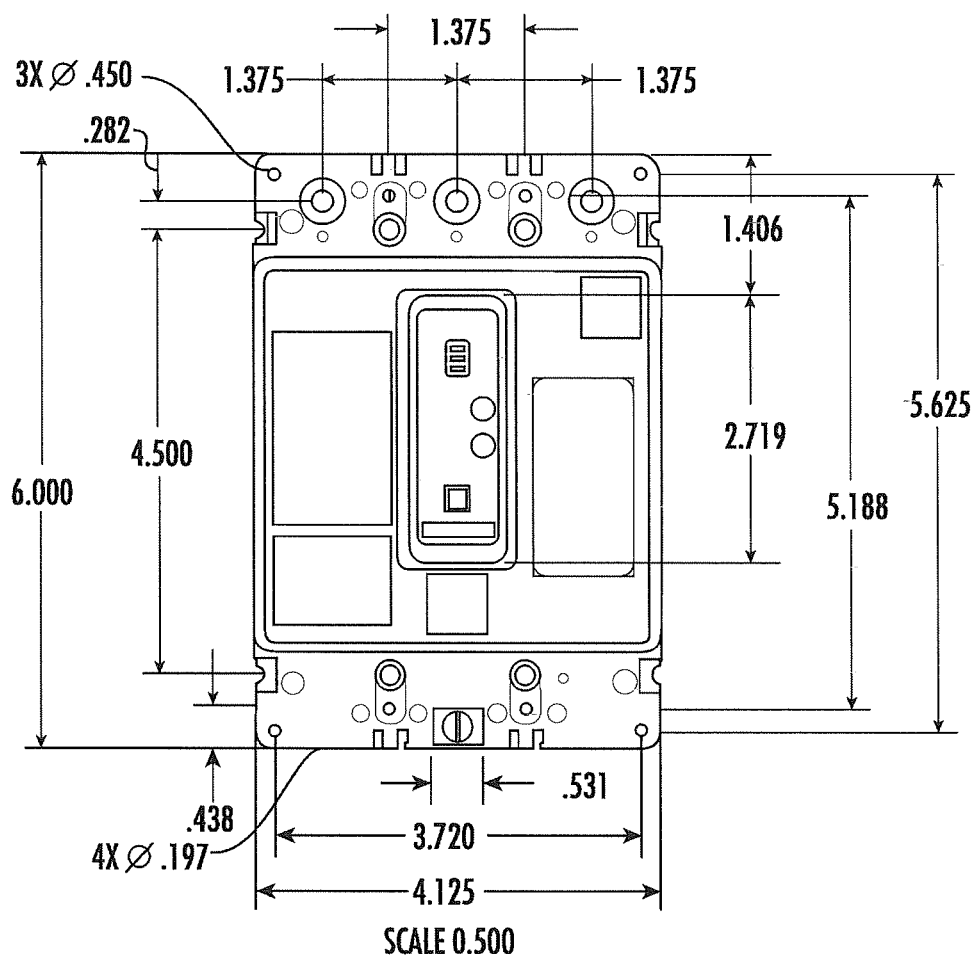
FIG. 9 is a top view of a surge protection device including various measurements thereon in accordance with some embodiments of the present inventive concept.
Figure 10:
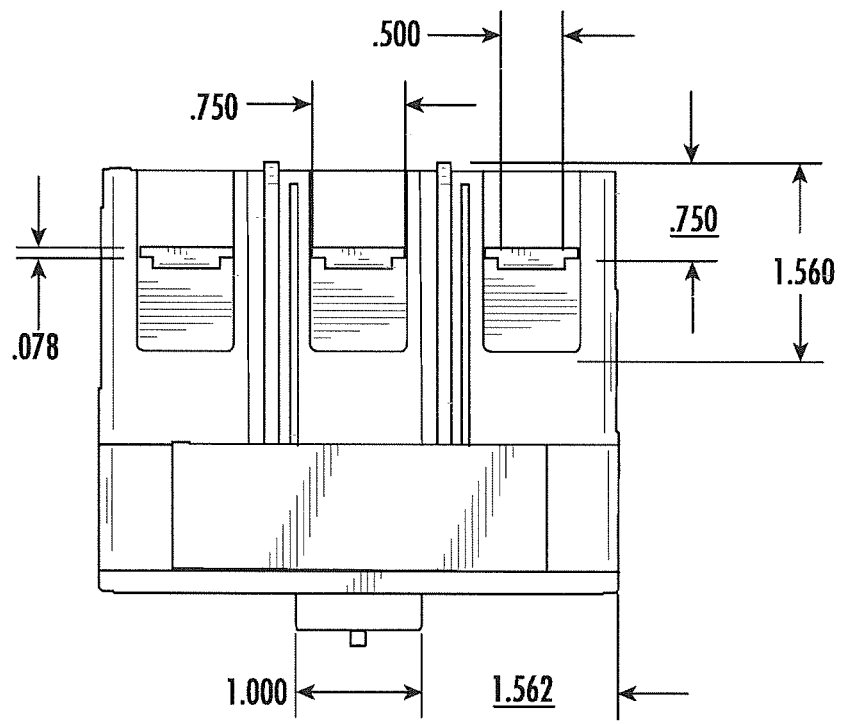
FIG. 10 is a side view of a line side of a surge protection device including various measurements thereon in accordance with some embodiments of the present inventive concept.
Figure 11:
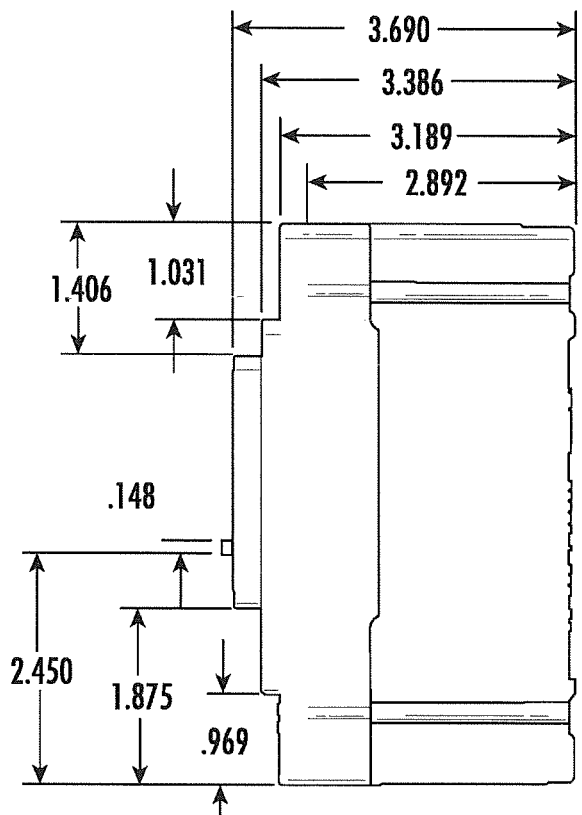
FIG. 11 is another side view of a surge protection device including various measurements thereon in accordance with some embodiments of the present inventive concept.

FIGS. 9 through 11 illustrate portions of the surge protection device discussed herein including various measurements. It will be understood that the measurements illustrated in FIGS. 9 through 11 are provided for example only and, therefore, embodiments of the present inventive concept are not limited thereto. In particular, FIG. 9 is a top view of a surge protection device including various measurements thereon in accordance with some embodiments of the present inventive concept. FIG. 10 is a side view of a line side of a surge protection device including various measurements thereon in accordance with some embodiments of the present inventive concept. FIG. 11 is another side view of a surge protection device including various measurements thereon in accordance with some embodiments of the present inventive concept.

FIG. 12 is a table including parameters for both a circuit breaker and a surge protection device in accordance with some embodiments of the present inventive concept. Ii will be understood that the parameters provided in the table of FIG. 12 are provided as examples only and that embodiments of the present inventive concept are not limited thereto.

Figure 13:
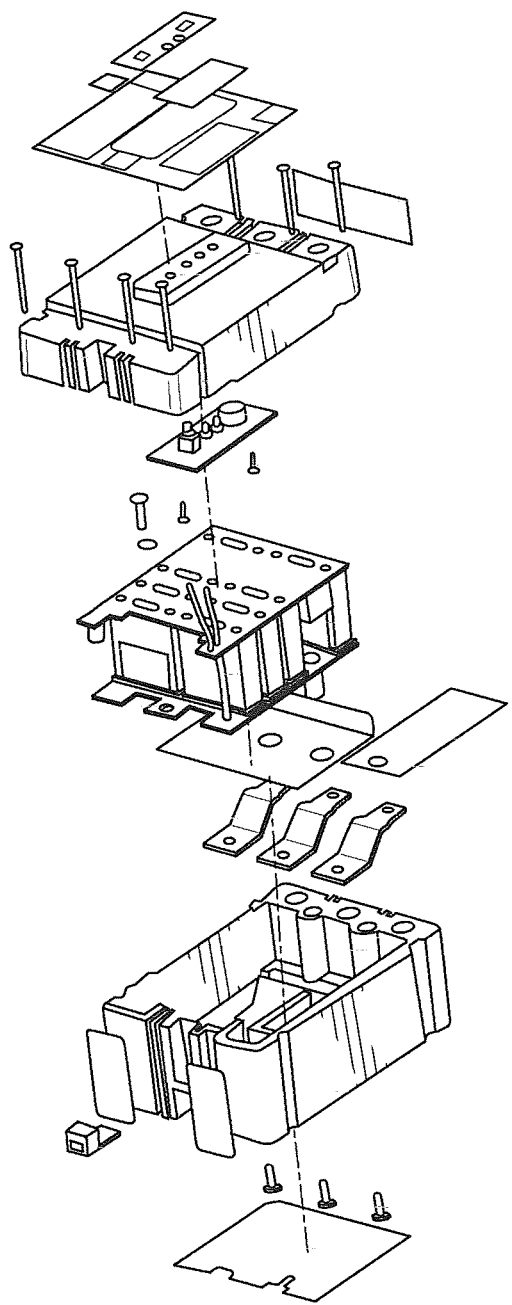
FIG. 13 is an exploded view of the surge protection device in accordance with various embodiments of the present inventive concept.
Figure 15B:
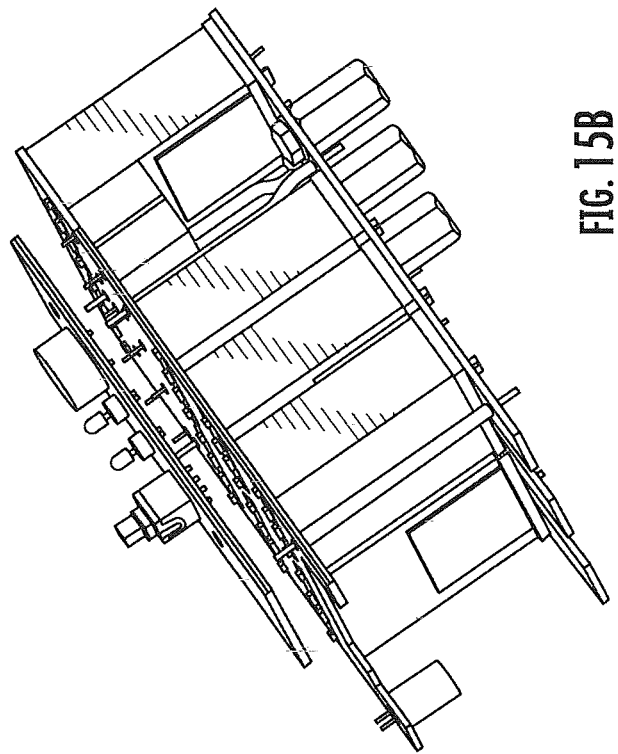
FIGS. 15A and 15B includes a series of diagrams illustrating PCB assembly in accordance with various embodiments of the present inventive concept.
Figure 15A:
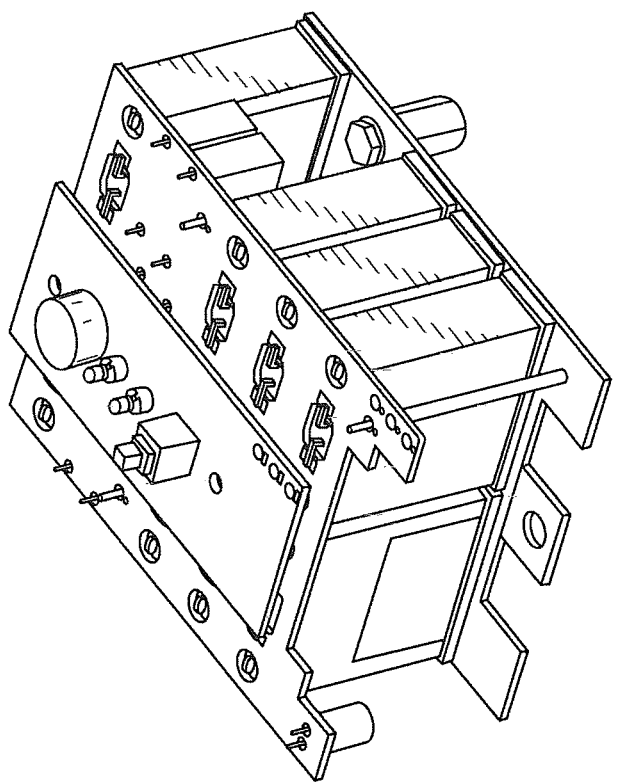
Figure 16C:
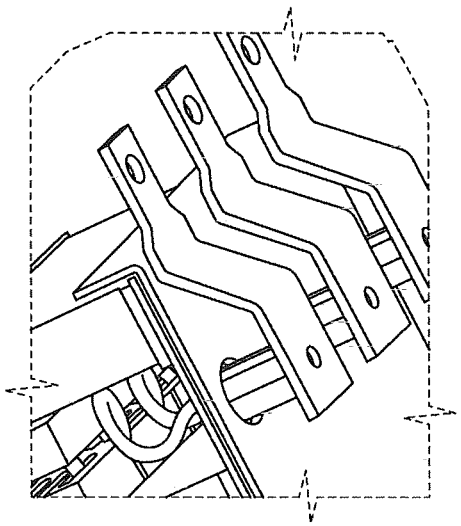
FIGS. 16A through 16F are a series of diagrams illustrating connection of the PCBs of the surge protection device in accordance with various embodiments of the present inventive concept.
Figure 16F:
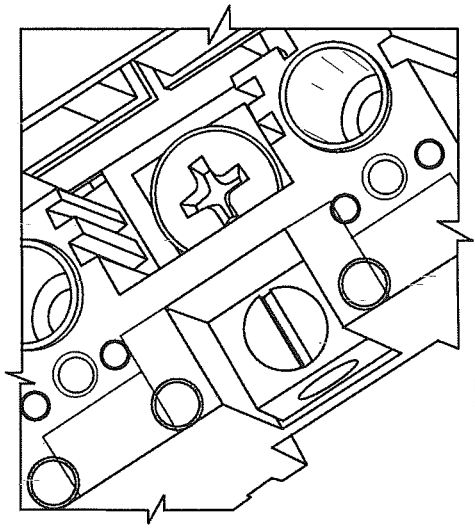
Figure 16B:
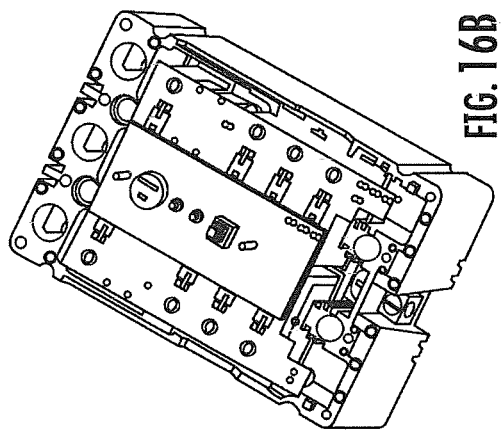
Figure 16E:
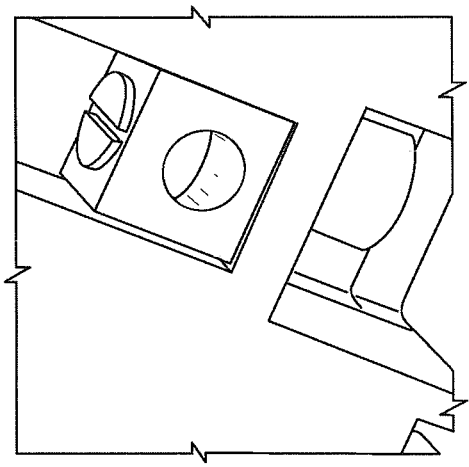
Figure 16A:
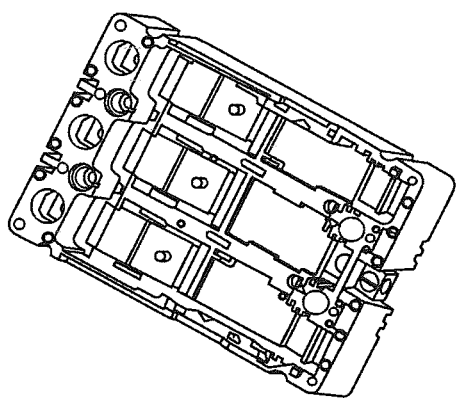
Figure 16D:
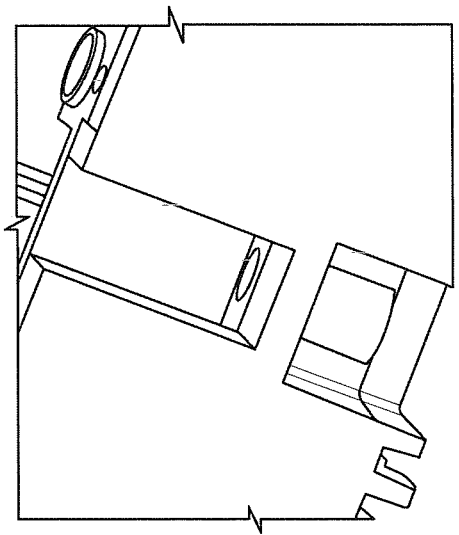
Figure 17A:
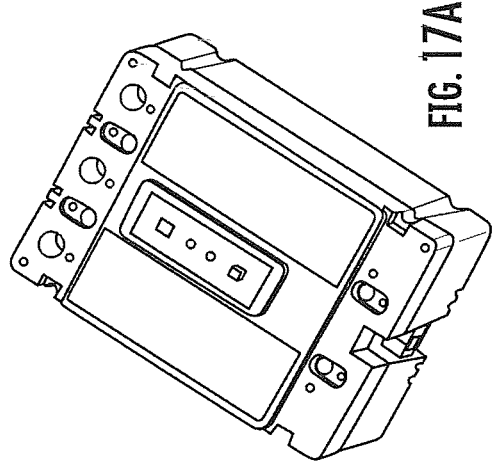
FIGS. 17A through 17F are a series of diagrams illustrating the enclosure of the surge protection device in accordance with various embodiments of the present inventive concept.
Figure 17B:
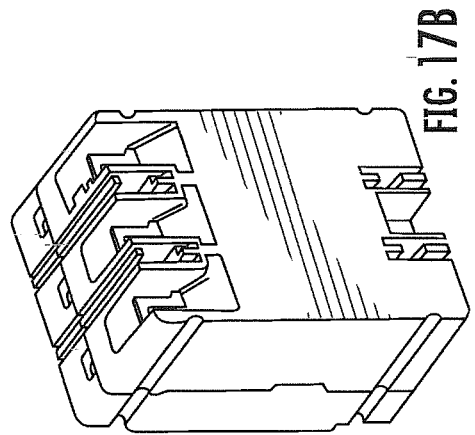
Figure 17C:
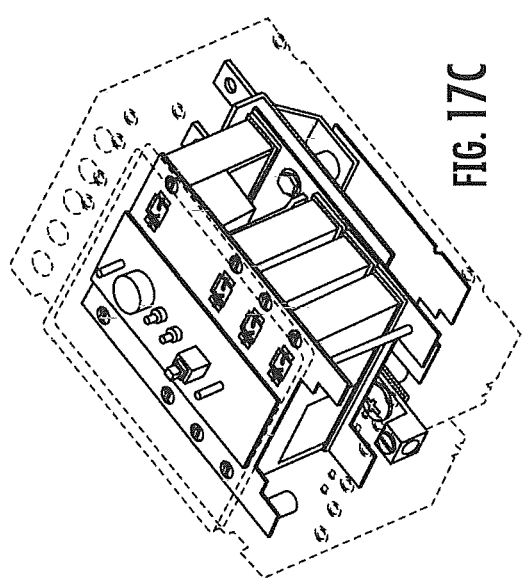
Figure 17D:
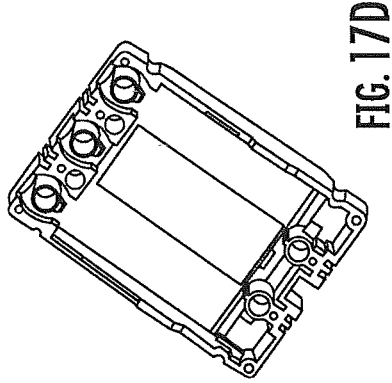
Figure 17E:
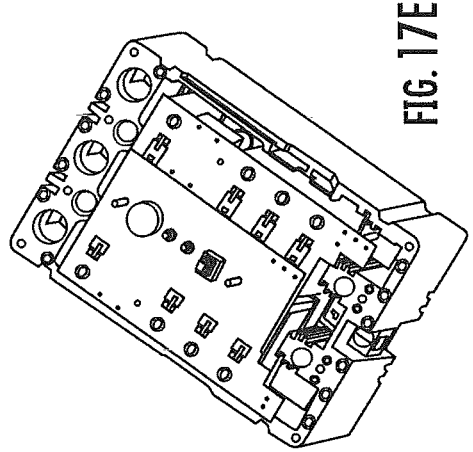
Figure 17F:
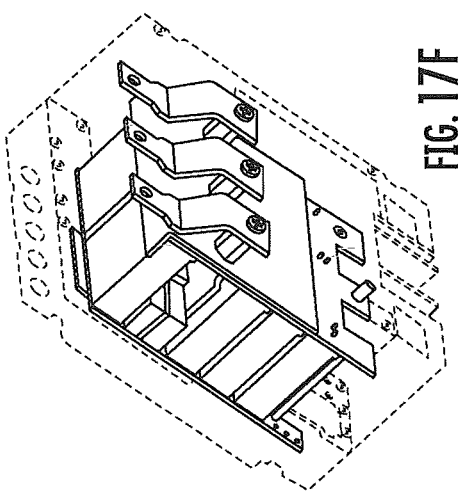

FIG. 13 is an exploded view of the surge protection device in accordance with various embodiments of the present inventive concept. The various parts that form a surge protection device and the assembly thereof will now be discussed with respect to FIG. 13. It will be understood that the exploded view and related assembly are provided as an example only and embodiments discussed herein are not limited thereto. As illustrated in FIG. 13, the surge protection device includes a base mold (1); a line conductor (2); an isolation barrier (3); a printed circuit board (PCB) (4); screws (5); terminal lugs (6); a lockwasher (7); screws (8); screws (9); a lid mold (10); screws (11); a base cover (12); an overlay (Eaton) (13); a status overlay (14); and an LED overlay (15).

An assembly process for the surge protection device will now be discussed with respect to FIG. 13. Operations begin by inserting the three line conductors (2) into the base (1) aligning the mounting holes with the holes in the base. The isolation barrier (3) is placed over three standoffs (shown in PCB (4)) on bottom of the PCB (4). The fold in the isolation barrier (3) should be on a side of the isolation barrier opposite the line conductors (2). The PCB (4) and line conductor (3) are placed into base (1) aligned with conductor mounting holds and holes in the base. The PCB (4) is secured with three screws (5) through the base (1) and into 3 Hex standoffs (in PCB) and torqued to 25 inches/lb. The terminal lug (6) is inserted through the slot in the base (1) and over the top of the of the bottom PCB large square copper pad. It is secured with the lockwasher (7) and thread forming screw (8) through lug and PCB (4) into the base and torqued to 25 inches/lb.

The PCB 249 (4) is snapped off from PCB status 248 and into position with components facing into the lid cavity (10). The PCB (4) is aligned through the holes with lid (10) and secured using two thread forming screws (9) torqued to 5 inches/lb. The lid (1) is secured to the base (1) with eight thread forming screws (11) torqued to 12 inches/lb.

Before completing the last two steps in the assembly, the surfaces of lid (10) and base (1) are cleaned with isopropyl alcohol or an equivalent thereof before adhesive backing on base cover, overlays and labels are secured. The base cover (12) is secured to the base (1) and placed the remaining overlays (13-15) and product labels.

FIGS. 14A through 17F are a series of diagrams illustrating various aspects of the surge protection device in various stages of assembly in accordance with some embodiments of the present inventive concept. FIGS. 14A through 14F are a series of diagrams illustrating printed circuit boards (PCBs) of the surge protection device in accordance with various embodiments of the present inventive concept. FIGS. 15A and 15B are diagrams illustrating PCB assembly in accordance with various embodiments of the present inventive concept. FIGS. 16A through 16F are a series of diagrams illustrating connection of the PCBs of the surge protection device in accordance with various embodiments of the present inventive concept. FIGS. 17A through 17F are a series of diagrams illustrating the enclosure of the surge protection device in accordance with various embodiments of the present inventive concept.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A bus mounted surge protection device configured to be positioned in a panelboard alongside one or more similarly sized circuit breaker devices,
   wherein the bus mounted surge protection device is configured to be received by a same provisional bus as the one or more similarly sized circuit breaker devices;
   wherein the bus mounted surge protection device is configured to protect all devices connected to the one or more similarly sized circuit breaker devices in the panelboard; and
   wherein the bus mounted surge protection device comprises a surge ground terminal on a load side of bus mounted surge protection device, the surge ground terminal is connected to a single bus using only a single wire such that the load side of the bus mounted surge protection device is connected to the single bus with a total of one wire and the one wire is the only wire connecting the bus mounted surge protection device to the panelboard.

2. The bus mounted surge protection device of claim 1, wherein the bus mounted surge protection device comprises a three phase bus mounted surge protection device.

3. The bus mounted surge protection device of claim 1, wherein the bus mounted surge protection device is positioned in a molded case similar in size and shape to corresponding ones of the one or more similarly sized circuit breaker devices in the panelboard.

4. The bus mounted surge protection device of claim 3, wherein a color of the molded case of the bus mounted surge protection device is a first color and a color of a molded case of the corresponding ones of the one or more similarly sized circuit breaker devices is a second color, different from the first color.

5. The bus mounted surge protection device of claim 3, wherein the bus mounted surge protection device comprises a light emitting diode (LED) panel on a front face of the molded case.

6. The bus mounted surge protection device of claim 3, wherein the bus mounted surge protection device further comprises a standard line side terminal and the surge ground terminal on the load side of the molded case and wherein the bus mounted surge protection device does not contain any load terminals.

7. The bus mounted surge protection device of claim 6, wherein the bus mounted surge protection device is direct bus mounted on a line side.

8. The bus mounted surge protection device of claim 6, wherein the surge ground terminal is provided in place of load side terminals on the corresponding ones of the one or more similarly sized circuit breaker devices.

9. The bus mounted surge protection device of claim 1, wherein the single bus comprises only one of a ground bus or a neutral bus.

10. A surge protection device comprising:
   a molded housing configured to be positioned in a panelboard alongside one or more similarly sized circuit breaker devices, the surge protection device being configured to protect all devices connected to the one or more similarly sized circuit breaker devices in the panelboard; and
   a standard line side terminal and a surge ground terminal on a load side of the molded housing, wherein the surge protection device does not contain any load terminals and wherein the surge ground terminal on the load side of surge protection device is connected to single bus using only a single wire such that the load side of the surge protection device is connected to the single bus with a total of one wire and the one wire is the only wire connecting the bus mounted surge protection device to the panelboard.

11. The surge protection device of claim 10, wherein the surge protection device is configured to be received by a same provisional bus as the one or more similarly sized circuit breaker devices.

12. The surge protection device of claim 10, wherein a color of the molded housing of the surge protection device is a first color and a color of a molded housing of the corresponding ones of the one or more similarly sized circuit breaker devices is a second color, different from the first color.

13. The surge protection device of claim 10, wherein the surge protection device comprises a light emitting diode (LED) panel on a front face of the molded housing.

14. The surge protection device of claim 10, wherein the surge protection device is direct bus mounted on a line side.

15. The surge protection device of claim 10, wherein the surge ground terminal is provided in place of load side terminals on the corresponding ones of the one or more similarly sized circuit breaker devices.

16. The surge protection device of claim 10, wherein the surge protection device comprises a three phase bus mounted surge protection device.

17. The surge protection device of claim 10, wherein the single bus comprises only one of a ground bus or a neutral bus.

* * * * *